United States Patent [19]

Nefedov et al.

[11] 4,267,070

[45] May 12, 1981

[54] CATALYST FOR THE SYNTHESIS OF AROMATIC MONOISOCYANATES

[76] Inventors: Boris K. Nefedov, ulitsa Shosseinaya, 9 kv. 64; Vladimir I. Manov-Juvensky, ulitsa Angarskaya, 1, korpus 3, kv. 72, both of Moscow; Jury I. Dergunov, prospekt Pobedy, 3, kv. 39; Anatoly I. Rysikhin, prospekt Pobedy, 3, kv. 7, both of Dzerzhinsk Gorkovskoi oblasti; Alexandr L. Chimishkian, Volgogradsky prospekt, 153, korpus 1, kv. 14, Moscow, all of U.S.S.R.

[21] Appl. No.: 89,300

[22] Filed: Oct. 30, 1979

[51] Int. Cl.³ .................... B01J 31/02; C07C 118/06
[52] U.S. Cl. ........................ 252/429 R; 260/453 PC
[58] Field of Search ............. 260/453 PC; 252/429 R

[56] References Cited

U.S. PATENT DOCUMENTS 3,576,835   4/1971   Smith et al. ............... 260/453 PC

*Primary Examiner*—Dolph H. Torrence
*Attorney, Agent, or Firm*—Lackenbach, Lilling & Siegel

[57] ABSTRACT

A catalyst for the synthesis of aromatic monoisocyanates comprising 1.64 to 16.6% by weight of palladium chloride, 0.16 to 47.6% by weight of an oxide of a metal of Group VB of the periodic system, 1.5 to 81.8% by weight of an oxide of a metal of Group VI B of the periodic system, 1.64 to 89.8% by weight of pyridine or an alkylsubstituted pyridine.

The use of the catalyst according to the invention in the synthesis of aromatic monoisocyanates makes it possible to obtain a high degree of conversion of the starting compound of up to 100%, a high yield of the desired product of up to 97%, and increased productivity of the catalyst of up to 40 g of the desired product per g of $PdCl_2$ per hour.

5 Claims, No Drawings

CATALYST FOR THE SYNTHESIS OF AROMATIC MONOISOCYANATES

FIELD OF THE INVENTION

The present invention is useful in the production of, for example, phenylisocyanates which comprise an inexpensive raw material for the manufacture of non-toxic agricultural preparations, in the synthesis of mono- and di-chlorosubstituted monophenylisocyanates which are employed in the manufacture of pesticides and plant growth regulators.

BACKGROUND OF THE INVENTION

Known in the art is a heterogeneous catalyst for the synthesis of aromatic monoisocyanates including m-bromo-, o- and p-chlorophenylisocyanate which contains 5 to 15% by weight of palladium supported on pumice promoted by salts of silver, manganese, cobalt, gold, nickel, iridium taken in an amount of from 5 to 20% by weight.

This catalyst is employed at a temperature within the range of from 100 to 240° C. under a pressure of from 1 to 150 atm. Halosubstituted phenylisocyanates are produced using this catalyst within 1.2 to 3 hours with a yield of from 5 to 15%. The catalyst productivity is 0.5 to 1.5 g of the desired product per hour per one g of $PdCl_2$ (cf. British Patent No. 1,205,521).

Also known in the art is a homogeneous catalyst comprising palladium chloride (0.5 to 5% by weight) in a mixture with acetonitrile. In the presence of this catalyst at a temperature of 200° C. under a pressure of from 50 to 700 atm and within a period of from 4 to 8 hours of the reaction there are obtained p-chloro and 2,4,6-trichlorophenylisocyanates with a yield of from 24 to 35% at a conversion of the nitrocompound of from 44 to 87%. Productivity of this catalyst is 2 to 5 g of the desired product per hour and per g of $PdCl_2$ (cf. U.S. Pat. No. 3,576,836). This prior art catalyst, however, has disadvantages including low activity and a long reaction time of up to 8 hours, as well as low productivity.

Also known in the art is a homogeneous-heterogeneous catalyst employed in the synthesis of aromatic monoisocyanates such as phenylisocyanate which contains 30 to 60% by weight of palladium chloride, and 40 to 70% by weight of vanadium pentoxide. In the presence of this catalyst, under a pressure of from 35 to 90 atm, a temperature of from 100° to 220° C., over a period of 4–5 hours, phenylisocyanate is obtained in a yield of from 82 to 92% at a conversion of nitrobenzene of from 90 to 100%. Selectivity is equal to 82–92%.

Disadvantages of this prior art catalyst include the necessity of its pre-treatment with carbon monoxide for the purpose of activation; a long reaction time of up to 5 hours and a low productivity of about 3 g of isocyanate per g of $PdCl_2$ per hour.

It is an object of the present invention to overcome the above-mentioned disadvantages.

It is an object of the present invention to provide a catalyst for the synthesis of aromatic monoisocyanates which has high activity without any pre-treatment thereof.

It is another object of the present invention to provide a catalyst for the synthesis of aromatic monoisocyanates which would ensure high productivity of the synthesis.

BRIEF SUMMARY OF THE INVENTION

These objects are accomplished by a catalyst for the synthesis of aromatic monoisocyanates containing palladium chloride and an oxide of a metal of Group V B of the periodic system, wherein, according to the present invention, additionally contained is an oxide of a metal of Group VI B of the periodic system and pyridine or an alkylsubstituted pyridine, the components being present in the following amounts, per cent by weight:
 palladium chloride: 1.64 to 16.6
 oxide of a metal of Group VB: 0.16 to 47.6
 oxide of a metal of Group VI B: 1.5 to 81.8
 pyridine or an alkylsubstituted pyridine: the balance.

The catalyst according to the present invention can perform the synthesis of aromatic monoisocyanates with a high conversion of the starting compound of up to 97% and with a higher productivity of up to 40 g of the desired produce per g of $PdCl_2$ per hour.

DETAILED DESCRIPTION OF THE INVENTION

The catalyst according to the present invention is intended for the synthesis of aromatic monoisocyanates such as tolylisocyanate, phenylisocyanate, 4-methylphenylisocyanate, 4-chlorophenylisocyanate, 3-chlorophenylisocyanate, 2-chloro phenylisocyanate, 3,4-dichlorophenylisocyanate.

The catalyst according to the present invention consists of 1.64 to 16.6% by weight of palladium chloride, 0.16 to 47.6% by weight of an oxide of a metal of Group VB of the periodic system such as vanadium pentoxide, niobium pentoxide, tantalum pentoxide; 1.5 to 81.8% by weight of an oxide of a metal of Group VI B of the periodic system such as molybdenum oxide, tungsten oxide and pyridine or an alkylderivative thereof in an amount of from 1.64 to 89.8% by weight.

We have experimentally found that the component proportions falling beyond the above-specified range result in substantially lowered yield of the desired product and considerably reduced productivity of the process. Thus, with increasing the content of palladium chloride above its maximum limit specified hereinabove (16.6% by weight), the process productivity falls markedly, while at a content of palladium chloride below 1.64% by weight, the desired produce yield and degree of conversion are noticeably reduced. In the case where the amount of pyridine in the catalyst composition is above 89.8% by weight, the synthesis productivity is considerably reduced, while at a content of pyridine of below 1.64% by weight, conversion is lowered, the desired product yield and the catalyst productivity are reduced as well. It has been experimentally found that where the amount of an oxide of a metal of Group V B of the periodic system is below 0.16% by weight, selectivity is lowered. A similar drop in selectivity is observed with an increased content of this component in the catalyst of above 47.6% by weight. The content of an oxide of a metal of Group VI B of the periodic system below 1.5% by weight results in lowered productivity, while at a content higher than 81.8% by weight the selectivity is decreased.

As it is well known, palladium chloride is a basic component of catalysts employed in the synthesis of isocyanates, though without additives this catalyst is inactive in this process. It has been found that in the presence of pyridine and an oxide of metals of Groups VB and VI B of the periodic system the activity and productivity, as well as selectivity of the catalyst are improved due to the fact that palladium chloride forms with these additives a catalytically most active form.

Incorporation, into the catalyst composition, of one of the oxides of a metal of Group VI B of the periodic system in combination with pyridine makes it possible to carry out the process under a pressure of from 50 to 150 atm, lower the content of an expensive palladium chloride, and increase, by 4–6 times, the catalyst productivity.

The catalyst according to the present invention is produced by intermixing previously dehydrated components in a solvent (such as mono- or dichlorobenzene) directly prior to charging them into a reactor.

The catalyst according to the present invention is employed under a pressure of from 50 to 150 atm CO at a temperature within the range of from 190° to 220° C. The synthesis duration is 2 hours.

With the use of the catalyst according to the present invention in the synthesis of aromatic monoisocyanates conversion of nitrocompounds is equal to 96–100%, the yield of isocyanates is 66 to 97%, productivity—10–39 g of the desired product per g of $PdCl_2$ per hour; selectivity 66–97%.

EXAMPLE 1

Into a 0.15 l autoclave there are charged 10 ml of chlorobenzene and a catalyst having the following composition: 1.64% $PdCl_2$ (0.01 g), 81.8% of $MoO_3$ (0.5 g), 0.16% of $V_2O_5$ (0.001 g), 16.4% (0.1 g) of pyridine. The mixture is added with 1 g of nitrobenzene, purged with carbon monoxide and the pressure thereof is increased to 100 atm. Then the reaction mass is heated for two hours at a temperature of 210° C. After cooling, the reaction products are separated from the residue and analysed by the method of gas-liquid chromatography. The conversion of nitrobenzene is 95%; the yield of phenylisocyanate is 82%; the catalyst productivity is 39 g of phenylisocyanate per g $PdCl_2$ per hour.

EXAMPLE 2

Carbonylation of 6 g of nitrobenzene is conducted under conditions similar to those described in the foregoing Example 1 at a temerature of 200° C. under CO pressure of 100 atm in the presence of a catalyst having the following composition: 16.6% (0.1 g) of $PdCl_2$, 8.4% (0.05 g) of $MoO_3$, 8.4% (0.05 g) of $Ta_2O_5$, 66.6% (0.4 g) of pyridine. The conversion of nitrobenzene is 100%, the yield of phenylisocyanate is 90%, the catalyst productivity is 27 g of phenylisocyanate/g $PdCl_2$ per hour.

EXAMPLE 3

Carbonylation of 2 g of nitrobenzene is conducted under conditions similar to those of Example 1 at a temperature of 190° C. under CO pressure of 100 atm in the presence of a catalyst having the following composition: 4.6% (0.02 g) of $PdCl_2$, 46.5% (0.2 g) of $MoO_3$, 2.4% (0.01 g) of $Nb_2O_5$, and 46.5% (0.20 g) of pyridine. The conversion of nitrobenzene is 90%, the yield of phenylisocyanate is 90%, the catalyst productivity is 40 g of phenylisocyanate/g $PdCl_2$ per hour.

EXAMPLE 4

Carbonylation of 2 g of nitrobenzene is conducted under conditions similar to those described in Example 1 at a temperature of 220° C. under CO pressure of 100 atm in the presence of a catalyst having the following composition: 8.3% of $PdCl_2$ (0.02 g), 41.7% of $MoO_3$ (0.10 g), 8.3% of $Nb_2O_5$ (0.02 g), 41.7% of pyridine (0.10 g). The conversion of nitrobenzene is 90%, the yield of phenylisocyanate is 80%, the catalyst productivity is 35 g of phenylisocyanate/g $PdCl_2$ per hour.

EXAMPLE 5

Carbonylation of 2 g of nitrobenzene is conducted under conditions similar to those of Example 1, at a temperature of 200° C. under CO pressure of 100 atm in the presence of a catalyst having the following composition: 6.8% of $PdCl_2$ (0.03 g), 45.5% of $MoO_3$ (0.20 g), 2.2% of $Nb_2O_5$ (0.01 g), 45.5% of pyridine (0.20 g). The conversion of nitrobenzene is 100%, the yield of phenylisocyanate is 95%, the catalyst productivity is 32 g of phenylisocyanate/g $PdCl_2$ per hour.

EXAMPLE 6

Carbonylation of 2 g of p-nitrotoluene is conducted under conditions similar to those of Example 1 at a temperature of 200° C. and CO pressure of 100 atm in the presence of a catalyst having the following composition: 5.6% of $PdCl_2$ (0.03 g), 18.5% of $MoO_3$ (0.10 g), 1.8% of $Nb_2O_5$ (0.01 g) and 74.1% of pyridine (0.40 g). The conversion of the nitrocompound is 100%, the yield of p-tolylisocyanate is 92%. the catalyst productivity is 31 g of isocyanate/g $PdCl_2$ per hour.

EXAMPLE 7

Carbonylation of 2 g of p-nitrotoluene is conducted under conditions similar to those of Example 1 at a temperature of 210° C. under CO pressure of 100 atm in the presence of a catalyst having the following composition: 8.3% of $PdCl_2$ (0.02 g), 41.7% of $MoO_3$ (0.10 g), 8.3% of $Nb_2O_5$ (0.02 g), 41.7% of pyridine (0.10 g). The conversion of the nitrocompound is 100%; the yield of p-tolylisocyanate is 80%, the catalyst productivity is 32 g of isocyanate/g of $PdCl_2$ per hour.

EXAMPLE 8

Carbonylation of 2 g of nitrobenzene is conducted under conditions similar to those of Example 1 at a temperature of 220° C. under CO presence of 50 atm in the pressure of a catalyst having the following composition: 4.6% of $PdCl_2$ (0.02 g) 46.5% $MoO_3$ (0.20 g), 2.4% of $Nb_2O_5$ (0.01 g), 46.5% of pyridine (0.20 g). The conversion of nitrobenzene is 81%, the yield of phenylisocyanate is 72%, the catalyst productivity is 30 g of phenylisocyanate/g $PdCl_2$ per hour.

EXAMPLE 9 (comparative)

Carbonylation of 2 g of nitrobenzene is conducted under conditions similar to those described in Example 1 at a temperature of 210° C. under CO pressure of 100 atm in the presence of a catalyst having the following composition: 14.3% $PdCl_2$ (0.1 g), 28.6% of $MoO_3$ (0.2 g), 57.1% of pyridine (0.4 g), but without an oxide of a metal of Group VB. The conversion of nitrobenzene is 100%, the yield of phenylisocyanate is 34%, the catalyst productivity is 3.4 g of phehylisocyanate/g $PdCl_2$ per hour.

EXAMPLE 10 (comparative)

Carbonylation of 2 g of nitrobenzene is conducted under conditions similar to those of Example 1 at a temperature of 220° C. under CO pressure of 100 atm in the presence of a catalyst having the following composition: 4.5% of $PdCl_2$ (0.01 g), 91.0% of $MoO_3$ (0.2 g), 4.5% of $Nb_2O_5$ (0.01 g), but without pyridine. The conversion of nitrobenzene is 28%, the yield of phenylisocyanate is 10%, the catalyst productivity is 2.8 g of phenylisocyanate/g $PdCl_2$ per hour.

EXAMPLE 11 (comparative)

Carbonylation of 2 g of nitrobenzene is conducted under conditions similar to those described in Example 1 hereinbefore at a temperature of 200° C. under CO pressure of 100 atm in the presence of a catalyst having the following composition: 48% of PdO; 48% of $MoO_3$, 4% of MgO. The conversion of the nitrocompound is 40%, the yield of phenylisocyanate is 30%, the catalyst productivity is 7 g of phenylisocyanate/g $PdCl_2$ per hour.

EXAMPLE 12

Into a 0.15 l autoclave there is charged a catalyst of the following composition: 4.8% by weight of $PdCl_2$ (0.02 g), 47.6% by weight of $V_2O_4$ (0.2 g), 23.8% by weight of $WO_3$ (0.1 g) 23.8% by weight of pyridine (0.1 g) in 10 ml of chlorobenzene. 1.2 g of p-chloronitrobenzene are added. then the autoclave is purged with carbon monoxide, its pressure is increased to 150 atm and the reaction mixture is heated for 2 hours at a temperature of 220° C. After cooling to 18°-20° C., the liquid products are separated from the precipitate and analyzed by the method of gas-liquid chromatography. The conversion of p-chloronitrobenzene is 98%, the yield of p-chlorophenylisocyanate is 84%, the catalyst productivity is 25 g of isocyanate/g $PdCl_2$ per hour.

EXAMPLE 13

Carbonylation of 1.2 g of m-chloronitrobenzene is conducted under conditions similar to those described in the foregoing Example 12, except that the catalyst employed has the following composition: 15% of $PdCl_2$ (0.1 g), 7.5% of $V_2O_4$ (0.05 g), 1.5% of $WO_3$ (0.01 g), 76% of pyridine (0.5 g) at a temperature of 220° C. under a pressure of carbon monoxide of 50 atm. The conversion of the nitrocompound is 100%, the yield of m-chlorophenylisocyanate is 89%, the catalyst productivity is 10 g of isocyanate/g $PdCl_2$ per hour.

EXAMPLE 14

Carbonylation of 2 g of p-chloronitrobenzene is conducted under conditions similar to those of Example 12 hereinabove, except that the catalyst employed has the following composition: 14.8% of $PdCl_2$ (0.08 g), 27.8% of $V_2O_4$ (0.15 g), 1.9% of $WO_3$ (0.01 g), 55.5% of pyridine (0.3 g), at a temperature of 210° C. under a pressure of carbon monoxide of 100 atm. The conversion of the nitrocompound is 100%, the yield of p-chlorophenylisocyanate is 96%, the catalyst productivity is 12 g of isocyanate/g $PdCl_2$ per hour.

EXAMPLE 15

Carbonylation of 2 g of o-chlorobenzene is conducted under conditions similar to those described in Example 12 in the presence of a catalyst of the following composition: 14.3% of $PdCl_2$ (0.05 g), 14.3% of $V_2O_4$ (0.05 g), 14.3% of $WO_3$ (0.05 g), 57.1% of pyridine (0.2 g) at a temperature of 210° C. under a pressure of carbon monoxide of 100 atm. The conversion of the nitrocompound is 100%, the yield of o-chlorophenylisocyanate is 95%, the catalyst productivity is 19 g of isocyanate/g $PdCl_2$ per hour.

EXAMPLE 16

Carbonylation of 2 g of m-chloronitrobenzene is conducted under conditions similar to those described in Example 1 hereinabove in the presence of a catalyst containing 14.3% of $PdCl_2$ (0.05 g), 14.3% of $V_2O_4$ (0.05 g), 14.3% of $WO_3$ (0.05 g), and 57.1% of pyridine (0.2 g) at a temperature of 205° C. under a pressure of carbon monoxide of 100 atm. The conversion of the nitrocompound is 100%, the yield of m-chlorophenylisocyanate is 80%, the catalyst productivity is 16 g of isocyanate $PdCl_2$ per hour.

EXAMPLE 17

Carbonylation of 2 g of p-chloronitrobenzene is conducted under conditions similar to those specified in Example 12 in the presence of the catalyst of Example 15 at a temperature of 200° C. under a pressure of carbon monoxide of 100 atm. The conversion of the nitrocompound is 100%, the yield of p-chlorophenylisocyanate is 92%, the catalyst productivity is 18 g of isocyanate/g $PdCl_2$ per hour.

EXAMPLE 18

Carbonylation of 2 g of 3,4-dichloronitrobenzene is conducted under conditions similar to those of Example 12 in the presence of the catalyst described in the foregoing Example 15 at the temperature of 200° C. under the pressure of carbon monoxide of 100 atm. The conversion of the nitrocompound is 100%, the yield of 3,4-dichlorophenylisocyanate is 66%, the catalyst productivity is 11 g of isocyanate/g $PdCl_2$ per hour.

EXAMPLE 19

Carbonylation of 2 g of 3,4-dichloronitrobenzene is conducted under conditions similar to those of Example 12 in the presence of a catalyst containing 14.3% of $PdCl_2$ (0.05 g), 14.3% of $V_2O_5$ (0.05 g), 14.3% of $WO_3$ (0.05 g), 57.1% of pyridine (0.2 g) at a temperature of 205° C. under a pressure of carbon monoxide of 100 atm. The conversion of the nitrocompound is 100%, the yield of 3,4-dichlorophenylisocyanate is 70%, the catalyst productivity is 13 g of isocyanate/g $PdCl_2$ per hour.

EXAMPLE 20

Carbonylation of 2 g of m-chloronitrobenzene is conducted under conditions similar to those of Example 12 hereinbefore in the presence of the catalyst described in Example 19 at a temperature of 210° under a pressure of carbon monoxide of 100 atm. The conversion of the nitrocompound is 100% the yield of m-chlorophenylisocyanate is 90%, the catalyst productivity is 18 g of isocyanate/g $PdCl_2$ per hour.

EXAMPLE 21

Carbonylation of p-chloronitrobenzene is conducted under conditions similar to those of Example 12 in the presence of a catalyst containing 14.3% of $PdCl_2$ (0.05 g), 14.3% of $V_2O_5$ (0.05 g), 14.3% of $WO_3$ (0.05 g) and 57.1% of pyridine (0.2 g) at a temperature of 220° C. under a pressure of carbon monoxide of 100 atm. The conversion of the nitro-compound is 100%, the yield of p-chlorophenylisocyanate is 93%, the catalyst productivity is 19 g of isocyanate/g $PdCl_2$ per hour.

EXAMPLE 22

Carbonylation of 2 g of p-chloronitrobenzene is conducted under conditions similar to those of Example 12 in the presence of a catalyst having the following composition: 14.8% of PdCl$_2$ (0.08 g), 27.8% of V$_2$O$_5$ (0.15 g), 1.9% of WO$_3$ (0.01 g 55.5% of 3,5-dimethylpyridine (0.3 g) at a temperature of 205° under a pressure of carbon monoxide of 100 atm. The conversion of the nitrocompound is 100%, the yield of p-chlorophenylisocyanate is 97%, the catalyst productivity is 12.1 g of isocyanate/g of PdCl$_2$ per hour.

EXAMPLE 23

Carbonylation of 2 g of p-chloronitrobenzene is conducted under conditions similar to those of Example 12 in the presence of a catalyst having the following composition: 14.3% of PdCl$_2$ (0.05 g), 14.3% of V$_2$O$_4$ (0.05 g), 14.3% of WO$_3$ (0.05 g), 571.% of 4-methylpyridine (0.2 g) at a temperature of 210° C. under a pressure of carbon monoxide of 100 atm. The conversion of the nitrocompound is 100%, the yield of p-chlorophenylisocyanate is 97%, the catalyst productivity is 19.4 g of isocyanate per g of PdCl$_2$ per hour.

EXAMPLE 24

Carbonylation of 2 g of o-chloronitrobenzene is conducted under conditions similar to those of Example 12 in the presence of a catalyst of the following composition: 14.3% of PdCl$_2$ (0.05 g), 14.3% of V$_2$O$_5$ (0.05 g), 14.3%, of WO$_3$ (0.05 g), 57.1% of 4-ethylpyridine (0.2 g) at a temperature of 210° C. under a pressure of carbon of 100 atm. The conversion of the nitrocompound is 100%, the yield of o-chlorophenylisocyanate is 96%, the catalyst productivity is 19.2 g of isocyanate/g PdCl$_2$ per hour.

EXAMPLE 25

Carbonylation of 2 g of p-chloronitrobenzene is conducted under conditions similar to those described in Example 12 in the presence of a catalyst containing 14.3% of PdCl$_2$ (0.05 g), 14.3% of V$_2$O$_4$ (0.05 g), 14.3% of WO$_3$ (0.05 g), 57.1% of 2-methylpyridine (0.2 g) at a temperature of 210° C. under a pressure of carbon monoxide of 100 atm. The conversion of the nitrocompound is 100%, the yield of p-chlorophenylisocyanate is 91%, the catalyst productivity is 18 g of isocyanate per g of PdCl$_2$ per hour.

EXAMPLE 26 (comparative)

Carbonylation of 2 g of o-chloronitrobenzene is conducted under conditions similar to those of Example 12 in the presence of a catalyst of the following composition: 25% of PdCl$_2$, 50% of WO$_3$ and 25% of pyridine at a temperature of 200° C. under a pressure of carbon monoxide of 200 atm. The conversion of the nitrocompound is 30%, the yield of o-chlorophenylisocyanate is 26%, the catalyst productivity is 5.2 g of isocyanate/g PdCl$_2$ per hour.

EXAMPLE 27 (comparative)

Carbonylation of p-chloronitrobenzene is conducted under conditions similar to those of Example 12 in the presence of a catalyst having the following composition: 25% of PdCl$_2$, 50% of V$_2$O$_5$, 25% of pyridine at a temperature of 220° C. under a pressure of carbon monoxide of 100 atm. The conversion of the nitrocompound is 100%, the yield of p-chlorophenylisocyanate is 29%, the catalyst productivity is 5.6 of isocyanate per g of PdCl$_2$ per hour.

EXAMPLE 28 (comparative)

Carbonylation of m-chloronitrobenzene is conducted under conditions similar to those of Example 12 in the presence of a catalyst having the following composition: 17% of PdCl$_2$, 50% of V$_2$O$_5$, 33% of WO$_3$ at a temperature of 210° C. under a pressure of carbon monoxide of 100 atm. The conversion of the nitrocompound is 21%, the yield of m-chlorophenylisocyanate is 16%, the catalyst productivity is 3.2 g of isocyanate/g of PdCl$_2$ per hour.

EXAMPLE 29 (comparative)

Carbonylation of p-chloronitrobenzene is conducted under conditions similar to those of Example 12 hereinbefore in the presence of a catalyst containing PdCl$_2$ and acetonitrile in a ratio of 1:10 at a temperature of 220° C. under a pressure of carbon monoxide of 150 atm. The conversion of the nitrocompound is 0%, the yield of isocyanate is 0%.

What is claimed is:

1. A catalyst for the synthesis of aromatic monoisocyanates consisting of 1.64 to 16.6% by weight of palladium chloride, 0.16 to 47.6% by weight of an oxide of a metal of Group V B of the periodic system, 1.5 to 81.8% by weight of an oxide of a metal of Group VI B of the periodic system, 1.64 to 89.8% by weight of pyridine or an alkyl-substituted pyridine.

2. The catalyst of claim 1, wherein the Group V B metal is vanadium and the Group VI B metal is molybdenum.

3. The catalyst of claim 1, wherein the Group V B metal is tantalum and the Group VI B metal is molybdenum.

4. The catalyst of claim 1, wherein the Group V B metal is niobium and the Group VI B metal is molybdenum.

5. The catalyst of claim 1, wherein the Group V B metal is vanadium and the Group VI B metal is tungsten.

* * * * *